United States Patent
Scheer et al.

(10) Patent No.: US 12,358,622 B2
(45) Date of Patent: Jul. 15, 2025

(54) CONVERTIBLE AIRCRAFT CARGO HANDLING SYSTEM

(71) Applicant: GOODRICH CORPORATION, Charlotte, NC (US)

(72) Inventors: Dustin P. Scheer, Jamestown, ND (US); Jens Sikau, Bremen (DE); Brennen Morrell, Jamestown, ND (US); Joshua R. Meidinger, Jamestown, ND (US); Phillip Molnar, Jamestown, ND (US); Andrew Kottsick, West Fargo, ND (US)

(73) Assignee: Goodrich Corporation, Charlotte, NC (US)

( * ) Notice: Subject to any disclaimer, the term of this patent is extended or adjusted under 35 U.S.C. 154(b) by 54 days.

(21) Appl. No.: 18/311,847

(22) Filed: May 3, 2023

(65) Prior Publication Data

US 2024/0367793 A1    Nov. 7, 2024

(51) Int. Cl.
*B64D 9/00*    (2006.01)

(52) U.S. Cl.
CPC .......... *B64D 9/00* (2013.01); *B64D 2009/006* (2013.01)

(58) Field of Classification Search
CPC ........ B64D 9/00; B64D 2009/006; B60P 1/52
USPC ................. 193/35 R; 198/860.1; 410/77, 80
See application file for complete search history.

(56) References Cited

U.S. PATENT DOCUMENTS

| | | | |
|---|---|---|---|
| 7,344,013 B2 | 3/2008 | Krueger | |
| 7,926,762 B2 | 4/2011 | Oetken et al. | |
| 9,663,231 B2 | 5/2017 | Koncz | |
| 10,377,572 B1 | 8/2019 | Meidinger et al. | |
| 10,399,661 B2 * | 9/2019 | Lampe | B64C 1/22 |
| 10,773,784 B2 | 9/2020 | Huber et al. | |
| 10,787,260 B2 | 9/2020 | Scheer et al. | |
| 11,117,645 B2 | 9/2021 | Nowarre et al. | |
| 11,401,023 B2 | 8/2022 | Spry et al. | |

(Continued)

FOREIGN PATENT DOCUMENTS

| | | |
|---|---|---|
| CN | 116409455 A | 7/2023 |
| EP | 0894713 | 2/1999 |

(Continued)

OTHER PUBLICATIONS

U.S. Appl. No. 17/845,736, filed Jun. 21, 2022 and entitled "Tray Connections for Convertible Aircraft Cargo Handling System", 33 pages.

(Continued)

*Primary Examiner* — Joshua D Huson
*Assistant Examiner* — Anna L. Gordon
(74) *Attorney, Agent, or Firm* — SNELL & WILMER L.L.P.

(57) ABSTRACT

A convertible cargo handling system is provided. The convertible cargo handling system includes a roller tray mounting system and a first roller tray. The roller tray mounting system includes a sealing plate and a first floor fitting coupled to the sealing plate, where the first floor fitting is configured such that a top edge of the first floor fitting is flush with a surface of a floor. The first roller tray includes a first set of walls and a first roller tray fitting, where the first set of walls are configured to nest along sides of the first floor fitting below the surface of the floor and where the first roller tray fitting is configured to rest on the top edge of the first floor fitting.

17 Claims, 11 Drawing Sheets

(56) References Cited

U.S. PATENT DOCUMENTS

| | | | |
|---|---|---|---|
| 11,535,359 B2 | 12/2022 | Stegmiller et al. | |
| 11,542,005 B2 | 1/2023 | Scheer et al. | |
| 2006/0243861 A1* | 11/2006 | Krueger | B64D 9/00 244/137.1 |
| 2007/0095978 A1* | 5/2007 | Oetken | B64D 9/003 244/118.1 |
| 2011/0127795 A1* | 6/2011 | Dunphy | B60J 3/0213 411/166 |
| 2012/0304579 A1* | 12/2012 | Dezoete | B64F 5/10 52/745.13 |
| 2018/0056848 A1* | 3/2018 | Koehler | B64D 9/003 |
| 2019/0210728 A1 | 7/2019 | Pfau et al. | |
| 2019/0276148 A1 | 9/2019 | Huber et al. | |
| 2020/0239122 A1 | 7/2020 | Scheer et al. | |
| 2020/0239123 A1 | 7/2020 | Stegmiller et al. | |
| 2021/0261041 A1 | 8/2021 | Shivalinga et al. | |
| 2021/0354828 A1 | 11/2021 | Nuessen et al. | |
| 2022/0003863 A1* | 1/2022 | Habib | G08G 5/0069 |
| 2022/0281603 A1 | 9/2022 | Rowles et al. | |
| 2022/0380018 A1 | 12/2022 | Kohler | |

FOREIGN PATENT DOCUMENTS

| | | | | |
|---|---|---|---|---|
| EP | 2441668 A2 * | 4/2012 | | B64C 1/20 |
| EP | 3680166 B1 * | 9/2021 | | B64C 1/061 |
| EP | 3640145 | 4/2022 | | |
| FR | 2930745 | 6/2009 | | |
| WO | WO-2016150891 A1 * | 9/2016 | | B64C 1/20 |

OTHER PUBLICATIONS

European Patent Office, European Search Report dated Oct. 31, 2023 in Application No. 23180443.6.

European Patent Office, European Search Report dated Sep. 16, 2024 in Application No. 24173684.2.

USPTO; Non-Final Office Action dated May 2, 2025 in U.S. Appl. No. 17/845,736.

* cited by examiner

CONVERTIBLE AIRCRAFT CARGO HANDLING SYSTEM

FIELD

The present disclosure relates to cargo handling systems, and more specifically, to a convertibility of cargo handling system architectures.

BACKGROUND

Today's rapidly evolving and uncertain world has driven the need for increased flexibility and modularity into modern aircraft cargo handling systems. The response to these requirements has led to the development of many "convertible" cargo handling systems that can be easily reconfigured to handle many different mission profiles including bulk cargo, passengers, containerized cargo, additional fuel tanks, etc. One typical implementation of this type of system utilizes discrete floor fittings attached to aircraft structure to provide standardized quick-attach interfaces for the cargo system components.

SUMMARY

A convertible cargo handling system is disclosed. The convertible cargo handling system includes a roller tray mounting system and a first roller tray. The roller tray mounting system includes a sealing plate and a first floor fitting coupled to the sealing plate, where the first floor fitting is configured such that a top edge of the first floor fitting is flush with a surface of a floor. The first roller tray includes a first set of walls and a first roller tray fitting. where the first set of walls are configured to nest along sides of the first floor fitting below the surface of the floor and where the first roller tray fitting is configured to rest on the top edge of the first floor fitting.

In various embodiments, the first roller tray is installed in a cargo compartment of a vehicle along a longitudinal direction of the cargo compartment. In various embodiments. the sealing plate couples to a frame structure of a vehicle. In various embodiments, the roller tray mounting system further includes a set of seal strips, where the set of seal strips is configured to provide a seal between a bottom edge of the first set of walls of the first roller tray and the sealing plate. In various embodiments, the convertible cargo handling system further includes a filler plate, where, responsive to the first roller tray being removed, the filler plate is configured to fill voids between the first floor fitting and a set of floor panels.

In various embodiments, the convertible cargo handling system further includes a second roller tray, the second roller tray configured to be installed perpendicular to the first roller tray. In various embodiments, the second roller tray includes a second set of walls and a second roller tray fitting, where the second set of walls are configured to nest along sides of a second floor fitting below the surface of the floor and where the second roller tray fitting is configured to rest on a top edge of the second floor fitting.

In various embodiments, the convertible cargo handling system further includes a detachable cargo controller, where the detachable cargo controller comprises a set of captive fasteners for coupling the detachable cargo controller to a cargo access door of a vehicle when the vehicle is in a containerized cargo configuration. In various embodiments, the detachable cargo controller includes an expansion port configured to connect to at least one of an external controller or a display. In various embodiments, the expansion port provides for at least one of troubleshooting of, maintenance of, programming of, or transferring data to or from, the convertible cargo handling system. In various embodiments, the convertible cargo handling system further includes a yz-rail, where the yz-rail is configured to be coupled between two or more guide rails of the convertible cargo handling system and where the yz-rail reduces skewing of containerized cargo as the containerized cargo is being loaded into a cargo compartment of a vehicle.

Also disclosed herein is an aircraft. The aircraft includes a cargo compartment and a convertible cargo handling system. The cargo compartment includes an aircraft frame structures and a set of floor panels coupled to the aircraft frame structures. The convertible cargo handling system includes a roller tray mounting system and a first roller tray. The roller tray mounting system includes a sealing plate and a first floor fitting coupled to the scaling plate, where the first floor fitting is configured such that a top edge of the first floor fitting is flush with a surface of the set of floor panels. The first roller tray includes a first set of walls and a first roller tray fitting, where the first set of walls are configured to nest along sides of the first floor fitting below the surface of the set of floor panels and where the first roller tray fitting is configured to rest on the top edge of the first floor fitting.

In various embodiments, the first roller tray is installed in the cargo compartment of the aircraft along a longitudinal direction of the cargo compartment. In various embodiments, the sealing plate couples to the aircraft frame structures. In various embodiments, the roller tray mounting system further includes a set of seal strips, where the set of seal strips is configured to provide a seal between a bottom edge of the first set of walls of the first roller tray and the sealing plate. In various embodiments, the convertible cargo handling system further includes a filler plate, where, responsive to the first roller tray being removed, the filler plate is configured to fill voids between the first floor fitting and the set of floor panels.

In various embodiments, the convertible cargo handling system further includes a second roller tray, the second roller tray configured to be installed perpendicular to the first roller tray. In various embodiments, the second roller tray includes a second set of walls and a second roller tray fitting, where the second set of walls are configured to nest along sides of a second floor fitting below the surface of the set of floor panels and where the second roller tray fitting is configured to rest on a top edge of the second floor fitting.

In various embodiments, the convertible cargo handling system further includes a detachable cargo controller, where the detachable cargo controller comprises a set of captive fasteners for coupling the detachable cargo controller to a cargo access door of the aircraft when the aircraft is in a containerized cargo configuration. In various embodiments, the detachable cargo controller further includes an expansion port configured to connect to at least one of an external controller or a display. In various embodiments, the expansion port provides for at least one of troubleshooting of, maintenance of, programming of, or transferring data to or from, the convertible cargo handling system. In various embodiments, the convertible cargo handling system further includes a yz-rail, where the yz-rail is configured to be coupled between two or more guide rails of the convertible cargo handling system and where the yz-rail reduces skewing of containerized cargo as the containerized cargo is being loaded into the cargo compartment of the aircraft.

Also disclosed herein is a roller tray mounting system. The roller tray mounting system includes a sealing plate and a floor fitting coupled to the sealing plate, where the floor fitting is configured such that a top edge of the floor fitting is flush with a floor surface.

In various embodiments, the roller tray mounting system further includes a set of seal strips, wherein the set of seal strips is configured to provide a seal between a bottom edge of a set of walls of a roller tray and the sealing plate.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Typical convertible cargo handling assemblies generally include floor fittings that are flush with the floor panels to prevent snagging of the bulk cargo when the containerized cargo system is removed and to allow for quick and modular replacement of components in the containerized cargo configuration. This flush mount configuration is beneficial in the bulk configuration but may present problems in the containerized configuration. In this flush mount configuration, the cargo system components attach to the top surface of the fittings, resulting in the entire cargo system shifting upward in a z-direction due to the thickness of the floor fittings relative to where a non-convertible cargo system would be, assuming the height of the cargo roller trays stay the same. This may result in lost cargo volume which may translate to lost revenue. This may also mean that containers designed for the non-convertible system may not fit in a convertible system. One non-ideal solution to this problem is to make the cargo system trays shorter by the height of the floor fittings. However, this solution is not easily achievable if reuse of existing components designed for the full height system is desired. The power drive unit (PDU) is an example of a high value reuse component that cannot be easily modified to fit in a shorter envelope without significant redesign.

Another issue in typical convertible cargo handling assemblies is the mounting of the lateral PDU. In typical systems, the lateral PDU is mounted within ball mats. This installation method may make a routing of wires difficult, especially if above-floor wiring is utilized. In typical systems, the wiring is routed along the side of roller tracks through a doorway, so the only way to route wires to the lateral PDU is to spur off a main wire run. Ball mats do not provide an easy way to run the wires from the roller trays to the PDU without having to have dedicated wireways under the ball mats, which may compromise the strength of the ball mats.

Another disadvantage of typical convertible cargo handling assemblies is that the location of a cargo controller may make it difficult to operate and troubleshoot the cargo handling system. Typical cargo controllers are mounted on an underside, when opened, of an access door. This location results in the joystick being below chest height and barely above the top of a container as the container is driven into the cargo compartment, which may make it difficult to view and access while operating. Another problem with the typical cargo controllers is that typical cargo controllers only have a single indicator (power status) light to show the state of the cargo handling system. This lack of status indication may make troubleshooting the cargo handling system difficult. Also, typical cargo controllers are permanently attached and not easily removable from the aircraft, which means the cargo controller is present even when the aircraft is in a bulk configuration. This adds excess weight and cost to the system that would otherwise not need to be there in the bulk configuration.

Yet another issue with typical convertible cargo handling assemblies is related to the guidance provided by the discrete yz-direction restraints while containers are moving down the compartment in a x (longitudinal) direction. The lack of continuous guidance throughout the cargo compartment may result in containers skewing and getting jammed on the yz-direction restraints. Typical cargo handling systems have a continuous rail opposite of the door to address this issue in the doorway, but do not have continuous guidance outside the doorway. This skewing is especially a problem for the first few feet a container travels outside the doorway.

Disclosed herein is an improved convertible cargo handling system. In accordance with various embodiments, the improved convertible cargo handling system includes an improved roller tray mounting system that reduces lost system height and/or volume due to an improved fixed portion of the quick-connect fittings. In that regard, in various embodiments, the improved fixed portion provides for roller tray to nest below the floor surface such that the cargo system is only shifted up in a z-direction a thickness of the sealing plate to which the fixed portion is attached relative to a nonconvertible cargo handling system.

In various embodiments, the improved convertible cargo handling system includes improved lateral power drive units (PDU) mounting in the improved roller tray mounting system such that there is no longer a need to machine complex features into the ball mat/fitting to support the PDU. In various embodiments, the improved convertible cargo handling system includes an improved cargo controller that couples to an aircraft access door in a same location but utilizes captive fasteners which will allow for quick removal and installation. In that regard, in various embodiments, the improved cargo controller allows for removal when the cargo compartment is in a bulk configuration, which saves cost and weight. In various embodiments, the improved cargo controller provides an expansion port that provides for a connection of an external display for easier troubleshooting/maintenance of the improved convertible cargo handling system. In various embodiments, the expansion port also provides for an external controller to be connected to make controlling the improved convertible cargo handling system easier. In various embodiments, the expansion port may also be used to program the improved convertible cargo handling system without having to disconnect the cargo controller from the aircraft as well as transferring data (prognostics, error codes, etc.) to and/or from the improved convertible cargo handling system.

In various embodiments, the improved convertible cargo handling system also provides for optional yz-direction side rails that may be installed in all or some of the compartment based on the need of the operator. In various embodiments, responsive to cargo skewing within the cargo compartment, yz-direction rails may be installed continuous and/or semi-continuous in locations where skewing is an issue.

Figure 1:
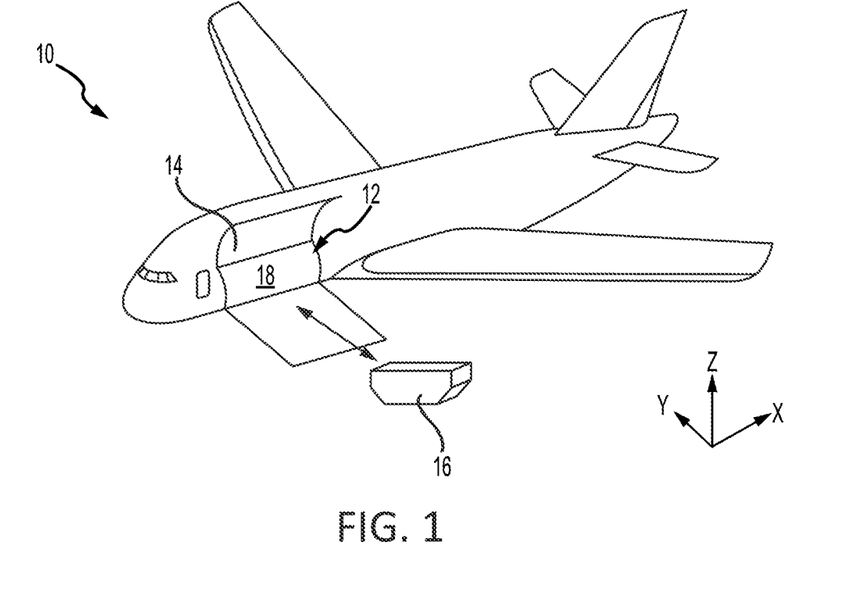
FIG. 1 illustrates a schematic view of an aircraft being loaded with cargo, in accordance with various embodiments.

With reference to FIG. 1, an aircraft 10 is illustrated having a cargo compartment 12. A cargo door 14 provides access to cargo compartment 12 from outside the aircraft 10. Cargo 16 (e.g., pallets, ULDs, luggage, etc.) may be loaded and unloaded through cargo door 14 and onto a cargo deck 18 of aircraft 10. In various embodiments, cargo deck 18 of the cargo system may be equipped with one or more power drive units (PDUs) configured to propel the cargo 16 across cargo deck 18 in a desired direction.

Figure 2A:
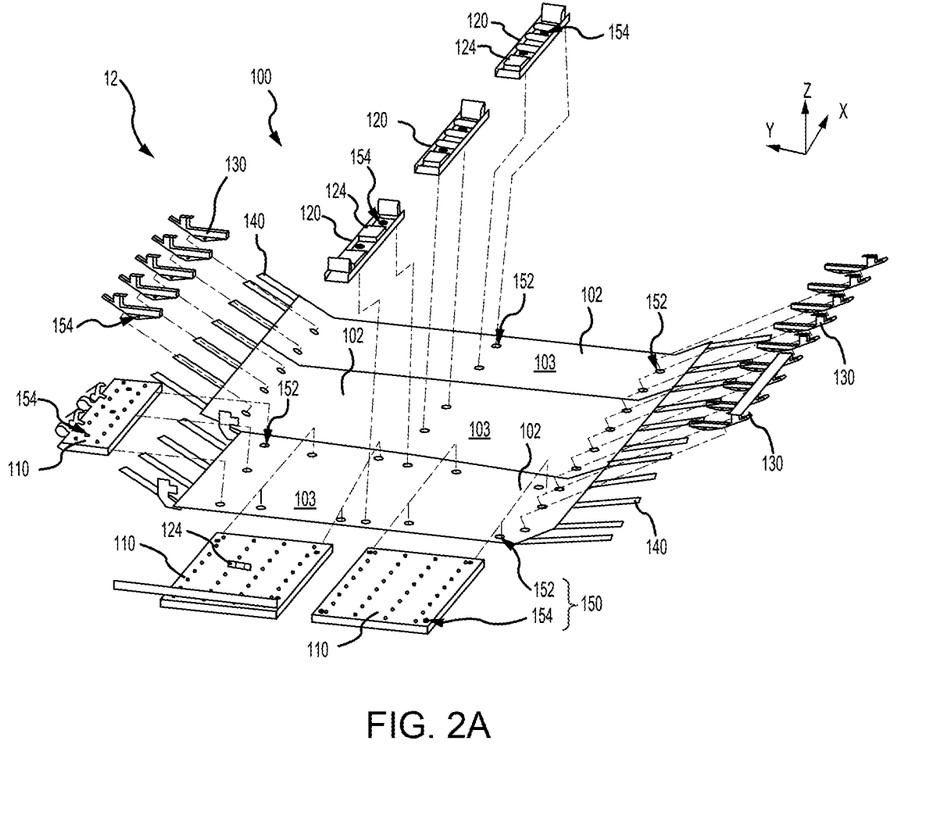
FIG. 2A illustrates an assembly view of a convertible cargo handling assembly, in accordance with various embodiments.
Figure 2B:
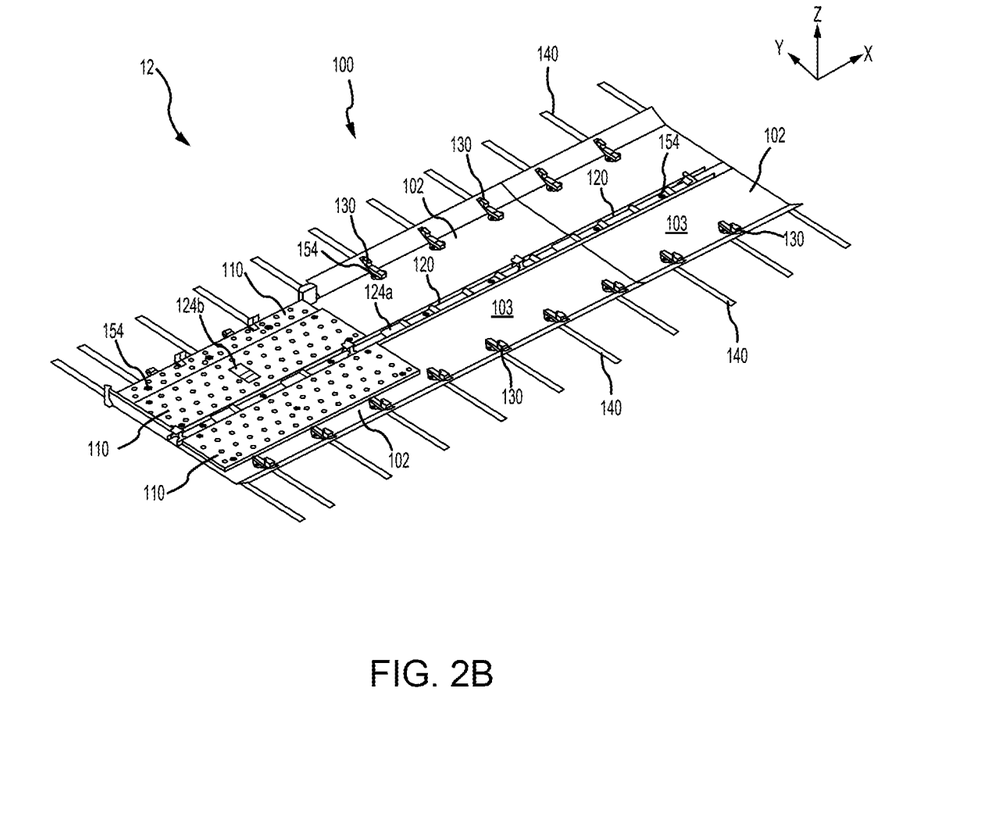
FIG. 2B illustrates a convertible cargo handling assembly configured for handling containerized cargo, in accordance with various embodiments.

With reference to FIGS. 2A and 2B, a convertible cargo handling assembly 100, which may be located within cargo compartment 12, is illustrated. In accordance with various embodiments, convertible cargo handling assembly 100 may be converted between a containerized mode (FIG. 2B), configured to handle containerized cargo, and a bulk mode for handling bulk cargo items individually. Convertible cargo handling assembly 100 comprises a plurality of floor panels, or panels 102. Panels 102 may line the cargo compartment 12. For example, panels 102 are located along the floor and walls of cargo compartment 12. Panels 102 are located over aircraft frame structures 140. In this regard, panels 102 may form the cargo deck 18, with momentary reference to FIG. 1. In various embodiments, convertible cargo handling assembly 100 includes components configured to facilitate translation of containerized cargo over panels 102. For example, convertible cargo handling assembly 100 may include ball mats 110, roller trays 120, and guide rails 130. Ball mats 110 may be located proximate cargo door 14, with momentary reference to FIG. 1. Convertible cargo handling assembly 100 may be equipped with one or more power drive units (PDUs) 124a and 124b configured to propel containerized cargo in a desired direction. PDUs 124a may be located in roller trays 120 and PDUs 124b may be located in ball mats 110. In various embodiments, PDUs 124a and 124b may be mounted inside of their own, separate structure, outside ball mats 110 and roller trays 120. As discussed in further detail below, ball mats 110, roller trays 120, and guide rails 130 are each removably coupled to aircraft frame structures 140 via one or more quick-connect fitting(s) 150.

Quick-connect fittings 150 each include a fixed portion 152 attached to an aircraft frame structures 140 and one or more coupling component(s) 154 attached to a removable cargo handling component (i.e., attached to a ball mat 110, a roller tray 120, or a guide rail 130). In various embodiments, fixed portions 152 may include a series of seat track rails that are installed flush with panels 102 providing a similar interface as quick-connect fittings 150 in long continuous rails instead of discrete fittings. The coupling components 154 may rotate relative to, axially engage, slide in to, or form a threaded engagement with, the fixed portion 152 to secure ball mats 110, roller trays 120, and guide rails 130 to fixed portions 152 and aircraft frame structures 140. Fixed portions 152 are located within openings defined by panels 102. When convertible cargo handling assembly 100 is in a containerized mode (FIG. 2B), ball mats 110, roller trays 120, and guide rails 130 are attached to fixed portions 152. When convertible cargo handling assembly 100 is in the containerized mode, at least a portion of each ball mat 110, roller tray 120, and guide rails 130 is located on and/or overlaps surface 103 of ball mats 110. When convertible cargo handling assembly 100 is in a bulk mode, ball mats 110, roller trays 120, and guide rails 130 are removed from cargo compartment 12, while fixed portions 152 and ball mats 110 remain attached. In various embodiments, ball mats 110, roller trays 120, and guide rails 130 are secured to aircraft frame structures 140 independently of one another. Stated differently, each ball mat 110, roller tray 120, and guide rail 130 is secured via its own dedicated quick-connect fitting 150, as opposed to via a coupling to an adjacent ball mat 110, roller tray 120, and/or guide rail 130. In various embodiments, ball mats 110, roller trays 120, and/or guide rails 130 may be secured to aircraft frame structures 140 solely via quick-connect fittings 150.

Figure 3A:
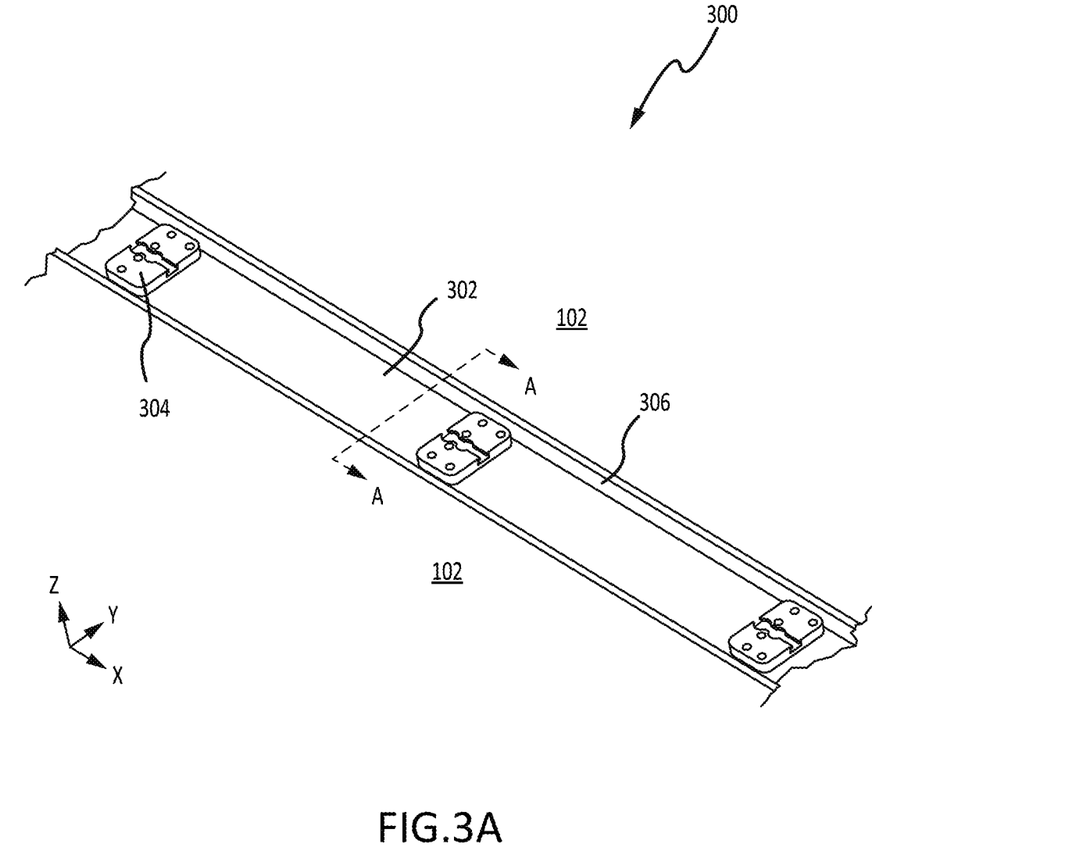
FIGS. 3A and 3B illustrate a roller tray mounting system, in accordance with various embodiments.
Figure 3B:
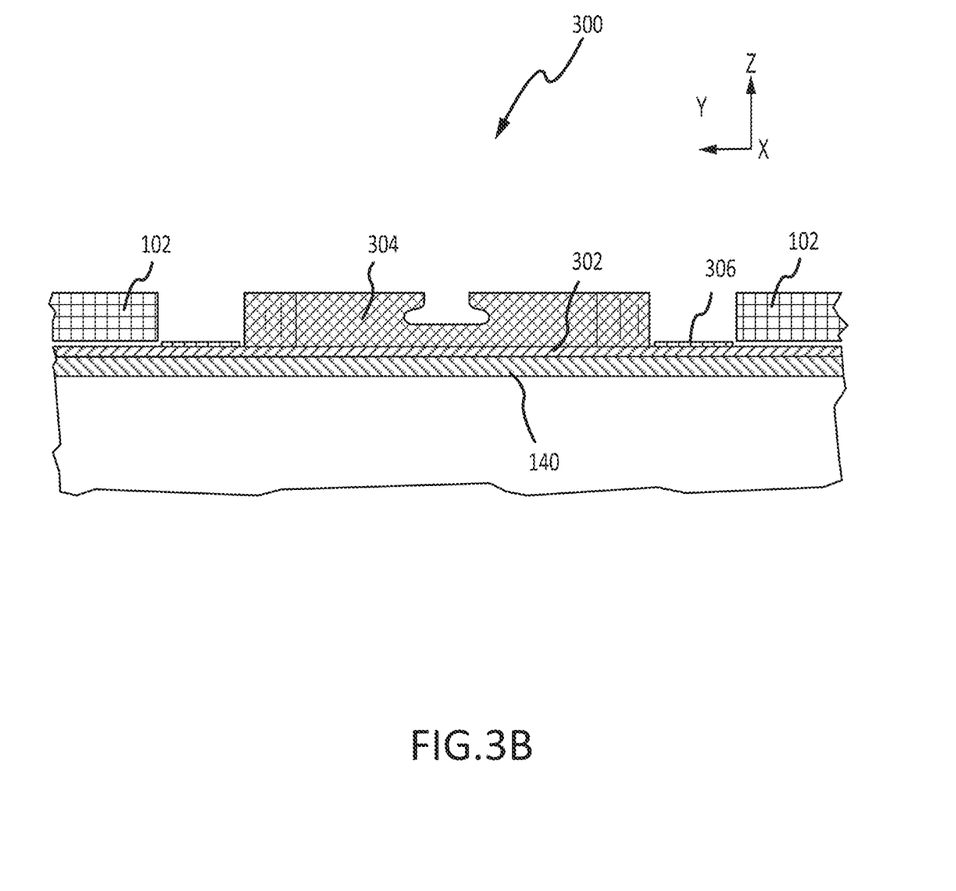

With reference to FIGS. 3A and 3B, a roller tray mounting system is illustrated, in accordance with various embodiments. FIG. 3B is a cross-sectional view of the modified quick-connect fitting taken along section line A-A, in accordance with various embodiments. In various embodiments, a roller tray mounting system 300 of the improved convertible cargo handling system uses a sealing plate 302 that is configured to be located between the aircraft frame structures 140 and the floor fitting 304, such as fixed portion 152 of FIG. 2A. In various embodiments, a lower portion, i.e. in a negative z-direction, of the sealing plate 302 is in contact with and coupled to the aircraft frame structures 140. In various embodiments, a lower portion, i.e. in a negative z-direction, of the floor fitting 304 is in contact with and coupled to an upper portion, i.e. in a positive z-direction, of the sealing plate 302. In various embodiments, the floor fitting 304 is configured to extend upward in a z-direction between walls of a roller tray, as will be described hereafter, such that the walls of the roller tray nests around the floor fitting 304, allowing the roller tray to mount below flush, i.e. a top portion, in the z-direction, of the panels 102. In that regard, a top edge, in a z-direction, of the floor fitting 304 is flush with a top edge, in a z-direction, of the panels 102. In various embodiments, the sealing plate 302 is further configured with seal strips 306 mounted to the upper portion, i.e. in a positive z-direction, of the sealing plate 302. In various embodiments, the seal strips 306 are configured to provide a flat surface to which the roller trays may seal, thereby aiding in the drainage of the roller tray mounting system. In various embodiments, the seal strips 306 are configured to provide a moisture tight, water-resistant seal between the roller trays and sealing plate 302. In various embodiments, the seal strips 306 may be a part of either the roller tray or the sealing plate 302.

Figure 4A:
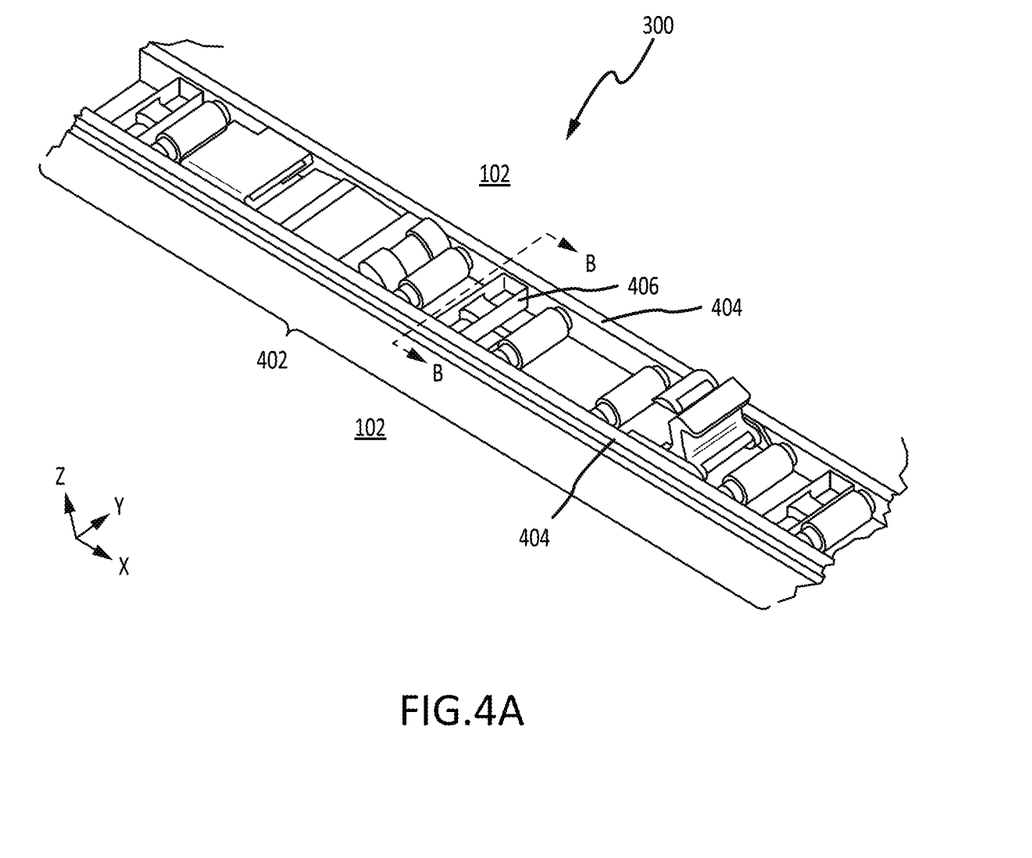
FIGS. 4A and 4B illustrate a roller tray coupled to a roller tray mounting system, in accordance with various embodiments.
Figure 4B:
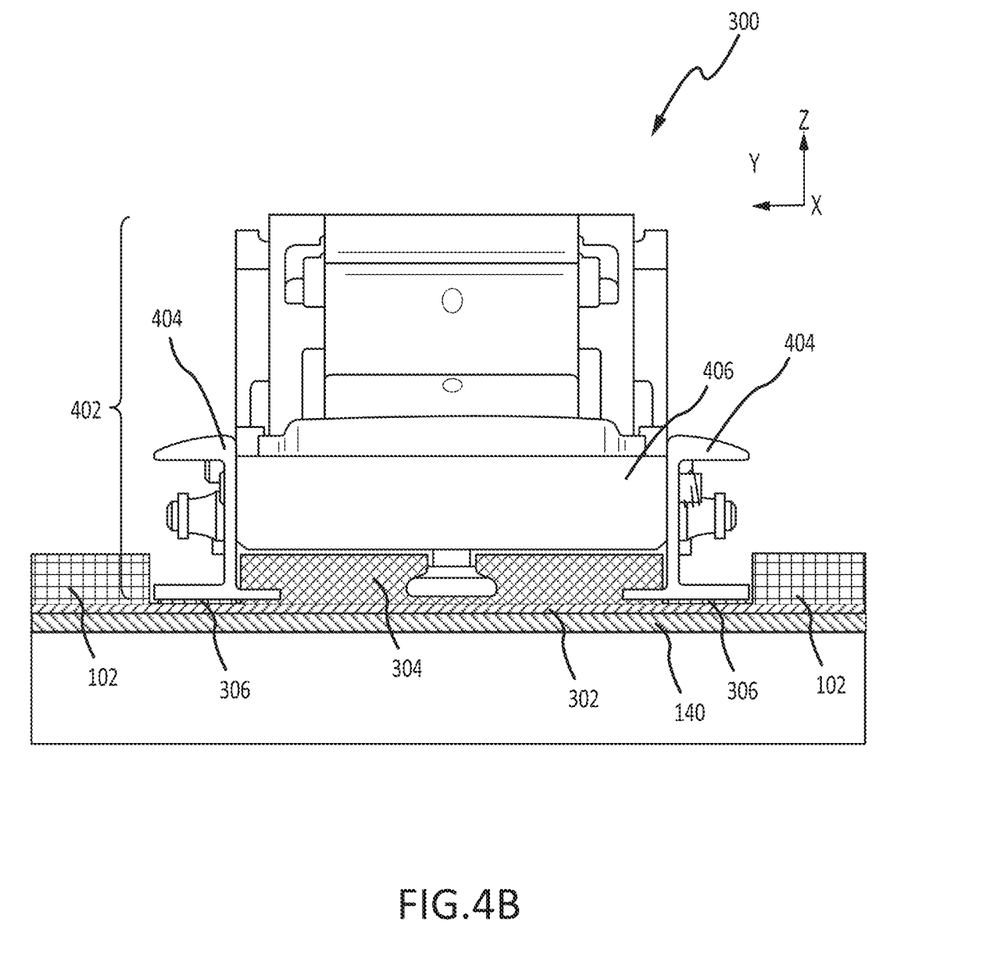

With reference to FIGS. 4A and 4B, a roller tray coupled to a roller tray mounting system is illustrated, in accordance with various embodiments. FIG. 4B is a cross-sectional view of the roller tray coupled to the modified quick-connect fitting taken along section line B-B, in accordance with various embodiments. In various embodiments, the roller tray mounting system includes the sealing plate 302 that is configured to be located between the aircraft frame structures 140 and the floor fitting 304. In various embodiments, the floor fitting 304 is configured to extend upward in a z-direction between walls 404 of a roller tray 402 such that the walls 404 the roller tray 402 nests around the floor fitting 304, allowing the roller tray 402 to mount below flush, i.e. a top portion, in the z-direction, of the panels 102. In that regard, in various embodiments, the roller tray 402 is configured to engage with the floor fitting 304 below the floor surface. In various embodiments, a lower portion or bottom edge, i.e. in a negative z-direction, of the walls 404 are configured with seal strips 306 mounted to the lower portion or bottom edge, i.e. in a negative z-direction, of the walls 404. In that regard, the seal strips 306 are configured to couple to and seal to the sealing plate 302. In various embodiments, the seal strips 306 are configured to provide a moisture tight seal between the lower portion of the walls 404 of the roller tray 402 and a top edge of the sealing plate 302. In various embodiments, the roller tray fitting 406 of the roller tray 402 is configured to rest on a top portion, i.e. in a positive z-direction, of the floor fitting 304 of the scaling plate 302.

Figure 5:
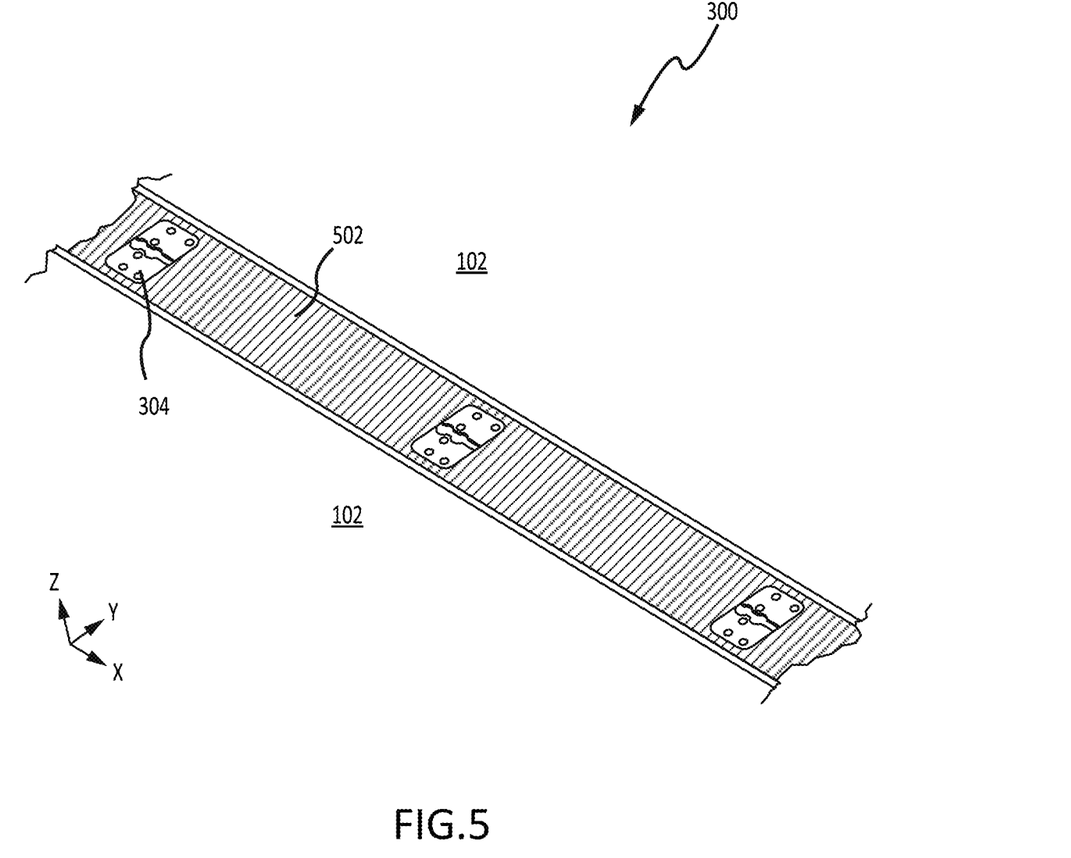
FIG. 5 illustrates a filler plate for use with an improved convertible cargo handling system that utilizes a roller tray mounting system, in accordance with various embodiments.

With reference to FIG. 5, a filler plate for use with an improved convertible cargo handling system that utilizes a roller tray mounting system is illustrated, in accordance with various embodiments. In various embodiments, responsive to the roller trays, such as roller tray 402 of FIGS. 4A and 4B, not being installed in the improved convertible cargo handling system, such that the improved convertible cargo handling system is in a bulk load configuration, filler plates 502 may be installed to fill the voids between the floor fittings and floor panels and to provide a smooth floor for bulk loading. In various embodiments, the filler plates 502 may be manufactures from metallic materials, metallic alloys, composites, plastics, or any light material, among others. In various embodiments, a lower portion or bottom edge, i.e. in a negative z-direction, of the filler plates 502 are configured with seal strips, such as seal strips 306 of FIG. 3, mounted to the lower portion or bottom edge, i.e. in a negative z-direction, of the filler plates 502. In that regard, the seal strips are configured to couple to and seal to the sealing plate 302. In various embodiments, the seal strips are configured to provide a moisture tight seal between the lower portion of the filler plates 502 and a top edge of the scaling plate 302.

Figure 6:
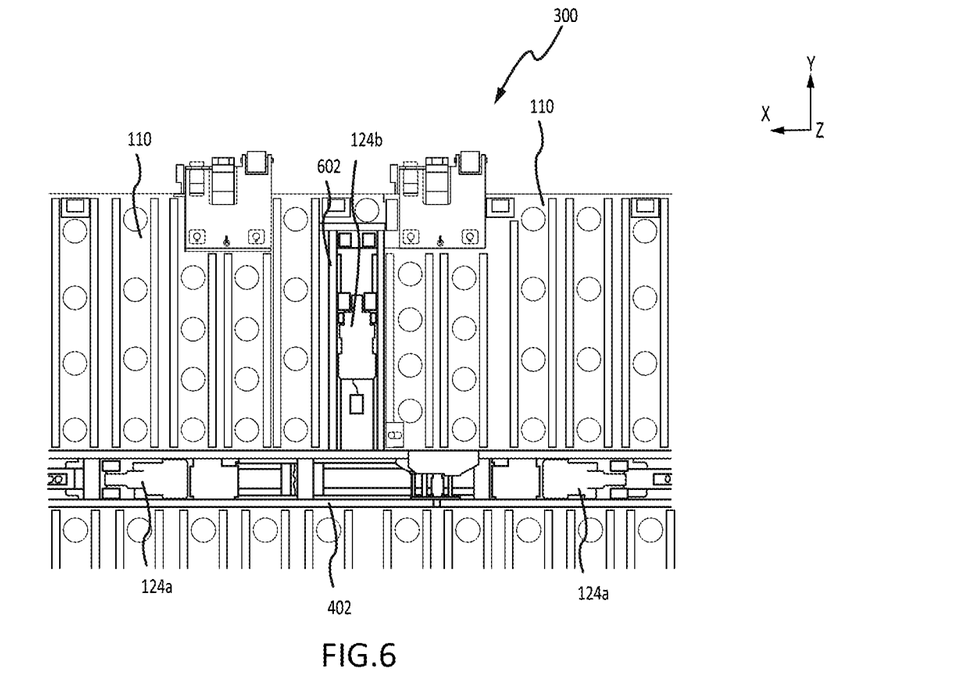
FIG. 6 illustrates an improved convertible cargo handling system that provides for mounting a lateral PDU in a roller tray rather than in a ball mat, in accordance with various embodiments.

With reference to FIG. 6, an improved convertible cargo handling system that provides for mounting a lateral PDU in a roller tray rather than in a ball mat is illustrated, in accordance with various embodiments. In various embodiments, rather than a lateral PDU 124 being mounted directly in ball mats 110, a lateral roller tray 602 is coupled to a fixed portion, such as floor fitting 304 of FIGS. 3A, 3B, 4A, and 4B of a modified quick-connect fitting of the roller tray mounting system 300. In various embodiments, the lateral roller tray 602 is similar in construction to roller tray 402 of FIGS. 4A and 4B and coupled to one or more fixed portions, such as floor fitting 304 of FIGS. 3A and 3B, coupled to a similar scaling plate, such as scaling plate 302 of FIGS. 3A and 3B, as discussed previously. In various embodiments, the ball mats 110 are then installed around the roller trays 602 and 402.

Figure 7:
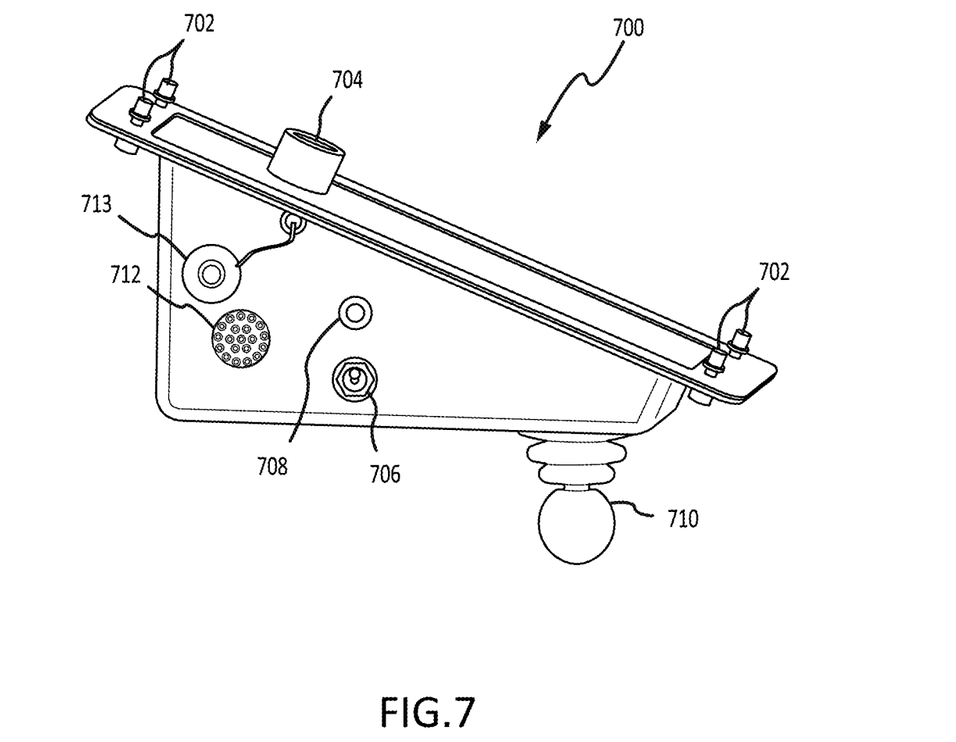
FIG. 7 illustrates an improved cargo controller for use in an improved convertible cargo handling system, in accordance with various embodiments.

With reference to FIG. 7, an improved cargo controller for use in an improved convertible cargo handling system is illustrated, in accordance with various embodiments. As stated previously, typically cargo controllers are mounted on an underside, when opened, of a cargo access door and are present in the aircraft regardless of whether the aircraft is in a containerized cargo configuration or a bulk cargo configuration. In that regard, in various embodiments, detachable cargo controller 700 mounts to the cargo access door of the aircraft in the same location as the typical cargo controller but, utilizes captive fasteners 702 to allow for easy and quick installation and/or removal. In various embodiments, the detachable cargo controller 700 includes an aircraft interface 704 for coupling to an interfacing with the convertible cargo handling system, such as the convertible cargo handling system of FIGS. 3A, 3B, 4A, 4B, and 6. In various embodiments, the detachable cargo controller 700 includes a power switch 706 for turning the cargo controller on or off. In various embodiments, the detachable cargo controller 700 includes a status indicator 708 that, for example, indicates connectivity, activation, or fault, among others. In various embodiments, the detachable cargo controller 700 includes a joystick for controlling the one or more PDUs in response to the aircraft being in a containerized cargo configuration. In various embodiments, the detachable cargo controller 700 further includes an expansion port 712 which may be used to connect external controllers or displays, among others, to expand the capability of the detachable cargo controller 700. In various embodiments, the expansion port 712 may be mechanically configured to retain a cable or dongle, among others, that may be coupled to the expansion port 712. In various embodiments, responsive to the expansion port 712 not being utilized, a cap or cover 713 may be used to cover the connector of the expansion port 712. In various embodiments, responsive to the detachable cargo controller 700 being removed from the access door, a blank plate may be utilized to cover the opening in the aircraft door.

Figure 8:
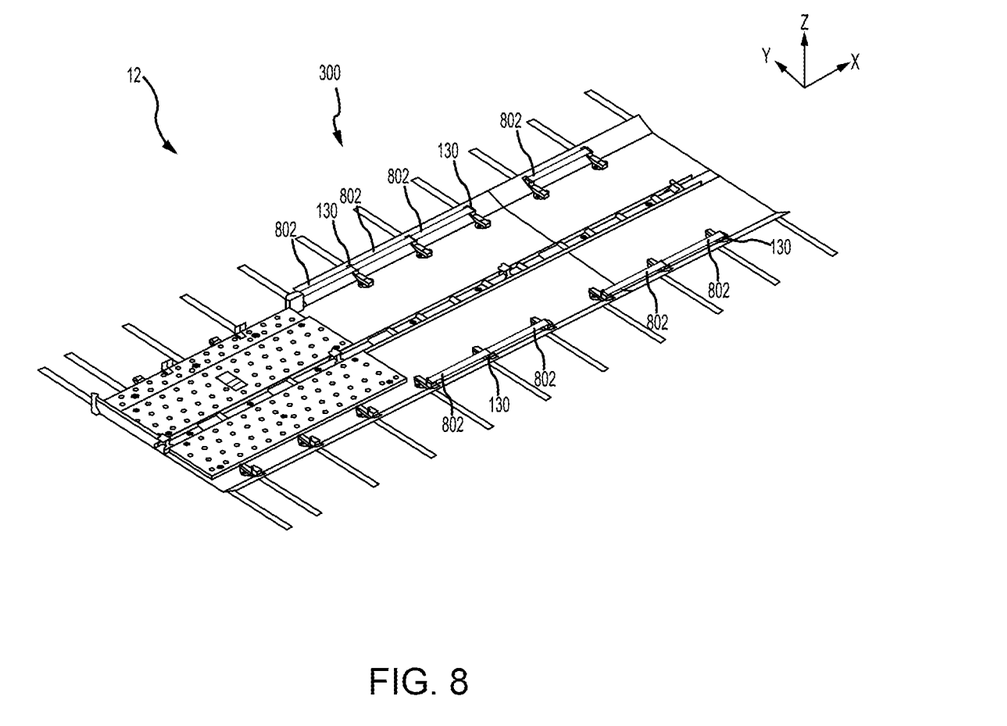
FIG. 8 illustrates an improved yz-direction rail provision for use in an improved convertible cargo handling system, in accordance with various embodiments.

With reference to FIG. 8, an improved yz-direction rail provision for use in an improved convertible cargo handling system is illustrated, in accordance with various embodiments. As stated previously, a lack of continuous guidance throughout the cargo compartment may result in containers skewing and getting jammed on the yz-direction restraints. In that regard, in various embodiments, continuous and/or semicontinuous yz-rails 802 are provided in the improved convertible cargo handling system in the cargo compartment 12 outside the doorway to help with guidance of containerized cargo. In various embodiments, the guide rails 130 are improved by adding provisions to mount yz-rails 802 between two or more the guide rails 130. In various embodiments, the yz-rails 802 are restrained in the z-direction by being coupled to the guide rails 130, which provide the z-direction restraint. In that regard, the yz-rails 802 provide guidance in a y-direction.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A convertible cargo handling system, comprising:
    a roller tray mounting system comprising:
        a sealing plate; and
        a first floor fitting coupled to the sealing plate, wherein the first floor fitting is configured such that a top edge of the first floor fitting is flush with a surface of a floor; and
    a first roller tray comprising:
        a first set of walls; and
        a first roller tray fitting, wherein the first set of walls are configured to nest along sides of the first floor fitting below the surface of the floor and wherein the first roller tray fitting is configured to rest on the top edge of the first floor fitting,
    wherein the roller tray mounting system further comprises:
        a set of seal strips, wherein the set of seal strips is configured to provide a seal between a bottom edge of the first set of walls of the first roller tray and a top edge of the sealing plate.

2. The convertible cargo handling system of claim 1, wherein the first roller tray is installed in a cargo compartment of a vehicle along a longitudinal direction of the cargo compartment.

3. The convertible cargo handling system of claim 1, wherein the sealing plate couples to a frame structure of a vehicle.

4. The convertible cargo handling system of claim 1, further comprising:
    a filler plate, wherein, responsive to the first roller tray being removed, the filler plate is configured to fill voids between the first floor fitting and a set of floor panels.

5. The convertible cargo handling system of claim 1, further comprising:
    a second roller tray, the second roller tray configured to be installed perpendicular to the first roller tray, the second roller tray comprising:
        a second set of walls; and
        a second roller tray fitting, wherein the second set of walls are configured to nest along sides of a second floor fitting below the surface of the floor and wherein the second roller tray fitting is configured to rest on a top edge of the second floor fitting.

6. The convertible cargo handling system of claim 1, further comprising:
    a detachable cargo controller, wherein the detachable cargo controller comprises a set of captive fasteners for coupling the detachable cargo controller to a cargo access door of a vehicle when the vehicle is in a containerized cargo configuration.

7. The convertible cargo handling system of claim 6, wherein the detachable cargo controller further comprises:
    an expansion port configured to connect to at least one of an external controller or a display, wherein the expansion port provides for at least one of troubleshooting of, maintenance of, programming of, or transferring data to or from, the convertible cargo handling system.

8. The convertible cargo handling system of claim 1, further comprising:
    a yz-rail, wherein the yz-rail is configured to be coupled between two or more guide rails of the convertible cargo handling system and wherein the yz-rail reduces skewing of containerized cargo as the containerized cargo is being loaded into a cargo compartment of a vehicle.

9. An aircraft, comprising:
    a cargo compartment, the cargo compartment comprising:
        aircraft frame structures; and
        a set of floor panels coupled to the aircraft frame structures; and a convertible cargo handling system, the convertible cargo handling system comprising:
  a roller tray mounting system comprising:
    a sealing plate; and
    a first floor fitting coupled to the sealing plate, wherein the first floor fitting is configured such that a top edge of the first floor fitting is flush with a surface of the set of floor panels; and
  a first roller tray comprising:
    a first set of walls; and
    a first roller tray fitting, wherein the first set of walls are configured to nest along sides of the first floor fitting below the surface of the set of floor panels and wherein the first roller tray fitting is configured to rest on the top edge of the first floor fitting,
  wherein the roller tray mounting system further comprises:
    a set of seal strips, wherein the set of seal strips is configured to provide a seal between a bottom edge of the first set of walls of the first roller tray and a top edge of the sealing plate.

10. The aircraft of claim 9, wherein the first roller tray is installed in the cargo compartment of the aircraft along a longitudinal direction of the cargo compartment.

11. The aircraft of claim 9, wherein the sealing plate couples to the aircraft frame structures.

12. The aircraft of claim 9, wherein the convertible cargo handling system further comprises:
  a filler plate, wherein, responsive to the first roller tray being removed, the filler plate is configured to fill voids between the first floor fitting and the set of floor panels.

13. The aircraft of claim 9, wherein the convertible cargo handling system further comprises:
  a second roller tray, the second roller tray configured to be installed perpendicular to the first roller tray, the second roller tray comprising:
    a second set of walls; and
    a second roller tray fitting, wherein the second set of walls are configured to nest along sides of a second floor fitting below the surface of the set of floor panels and wherein the second roller tray fitting is configured to rest on a top edge of the second floor fitting.

14. The aircraft of claim 9, wherein the convertible cargo handling system further comprises:
  a detachable cargo controller, wherein the detachable cargo controller comprises a set of captive fasteners for coupling the detachable cargo controller to a cargo access door of the aircraft when the aircraft is in a containerized cargo configuration.

15. The aircraft of claim 14, wherein the detachable cargo controller further comprises:
  an expansion port configured to connect to at least one of an external controller or a display, wherein the expansion port provides for at least one of troubleshooting of, maintenance of, programming of, or transferring data to or from, the convertible cargo handling system.

16. The aircraft of claim 9, wherein the convertible cargo handling system further comprises:
  a yz-rail, wherein the yz-rail is configured to be coupled between two or more guide rails of the convertible cargo handling system and wherein the yz-rail reduces skewing of containerized cargo as the containerized cargo is being loaded into the cargo compartment of the aircraft.

17. A roller tray mounting system, comprising:
  a sealing plate;
  a floor fitting coupled to the sealing plate, wherein the floor fitting is configured such that a top edge of the floor fitting is flush with a floor surface; and
  a set of seal strips, wherein the set of seal strips is configured to provide a seal between a bottom edge of a set of walls of a roller tray and a top edge of the sealing plate.

* * * * *